US012689259B2

(12) United States Patent
Lang et al.

(10) Patent No.: US 12,689,259 B2
(45) Date of Patent: Jul. 21, 2026

(54) HEAT SINK FOR A STATOR HOUSING

(71) Applicant: Bayerische Motoren Werke Aktiengesellschaft, Munich (DE)

(72) Inventors: Markus Lang, Munich (DE); Robert Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 203 days.

(21) Appl. No.: 18/700,114

(22) PCT Filed: Oct. 27, 2022

(86) PCT No.: PCT/EP2022/080107
§ 371 (c)(1),
(2) Date: Apr. 10, 2024

(87) PCT Pub. No.: WO2023/099094
PCT Pub. Date: Jun. 8, 2023

(65) Prior Publication Data
US 2025/0233476 A1 Jul. 17, 2025

(30) Foreign Application Priority Data
Dec. 1, 2021 (DE) ..................... 10 2021 131 599.9

(51) Int. Cl.
H02K 5/20 (2006.01)
(52) U.S. Cl.
CPC ..................................... H02K 5/20 (2013.01)
(58) Field of Classification Search
CPC ............. H02K 5/20; H02K 5/203; H02K 9/19
See application file for complete search history.

(56) References Cited

U.S. PATENT DOCUMENTS

| | | | | |
|---|---|---|---|---|
| 2,831,662 A | | 4/1958 | Hirsch | |
| 4,295,255 A | * | 10/1981 | Weber | B21D 53/027 |
| | | | | 29/890.037 |
| 2008/0303359 A1 | * | 12/2008 | Oestreich | H02K 5/203 |
| | | | | 310/54 |
| 2014/0111043 A1 | * | 4/2014 | Knappenberger | H02K 9/00 |
| | | | | 29/596 |
| 2015/0015096 A1 | * | 1/2015 | Huber | H02K 5/203 |
| | | | | 310/54 |

(Continued)

FOREIGN PATENT DOCUMENTS

| | | |
|---|---|---|
| DE | 10 2005 058 031 A1 | 6/2007 |
| DE | 10 2008 027 002 A1 | 12/2009 |
| DE | 10 2015 208 884 A1 | 11/2016 |

(Continued)

OTHER PUBLICATIONS

WO-2016155911-A1 Machine Translation (Year: 2016).*

(Continued)

*Primary Examiner* — Oluseye Iwarere
*Assistant Examiner* — Masoud Vaziri
(74) *Attorney, Agent, or Firm* — Crowell & Moring LLP

(57) ABSTRACT

A stator housing assembly for an electric drive machine includes a stator housing with a stator jacket receptacle that includes a cylinder inner jacket for receiving a stator outer jacket as well as a cylinder jacket-shaped outer surface, and includes at least one heat sink that is disposed on the outer surface and is connected thereto at wall edges.

20 Claims, 2 Drawing Sheets

(56)            References Cited

U.S. PATENT DOCUMENTS

2018/0076691  A1 *   3/2018  Cheng ..................... H02K 9/00

FOREIGN PATENT DOCUMENTS

| | | | |
|---|---|---|---|
| DE | 10 2017 120 827 | A1 | 3/2018 |
| DE | 10 2018 129 226 | A1 | 5/2020 |
| JP | 2010-57309 | A | 3/2010 |
| JP | 2019-213350 | A | 12/2019 |
| WO | WO-2016155911 | A1 * | 10/2016  .............. H02K 5/02 |
| WO | WO 2018/114099 | A1 | 6/2018 |

OTHER PUBLICATIONS

International Search Report (PCT/ISA/210) issued in PCT Application No. PCT/EP2022/080107 dated Feb. 15, 2023 with English translation (6 pages).

German-language Written Opinion (PCT/ISA/237) issued in PCT Application No. PCT/EP2022/080107 dated Feb. 15, 2023 with English translation (12 pages).

German-language Search Report issued in German Application No. 10 2021 131 599.9 dated Sep. 15, 2022 with partial English translation (12 pages).

* cited by examiner

HEAT SINK FOR A STATOR HOUSING

BACKGROUND AND SUMMARY

The invention relates to a cooling body for abutment against an outer surface to be cooled of a component to be cooled, to a stator-housing arrangement for an electric drive machine, and to a method for assembling a stator-housing arrangement.

In an electric drive machine, waste heat is generated during operation and has to be removed. This can be achieved via a housing cooling arrangement, in the case of which the waste heat is released for example via cooling ribs on the housing to the ambient air or via a cooling body to a cooling medium conducted therein. If a cooling channel is used, this can be integrated directly in a housing. A housing can also consist of multiple parts, wherein the cooling channel is provided on the surface of one of these parts. Such cooling channels can be realized for example by common casting processes or by machining. The design of an internal cooling channel in a housing is in this case limited, however, for example as a result of the need to remove the sand core and the core supports. In the case of conventional multi-part housings, the housing parts and regions of the cooling channel that are in contact with the housing parts frequently have to undergo cumbersome mechanical re-work in order that the housing parts can be joined properly. Relatively new approaches, such as for example 3D printing processes, SLM (selective laser melting) processes and the like, are frequently limited by a size of a corresponding manufacturing installation or a maximum component size predefined thereby, relatively high costs and long manufacturing durations, and are therefore not usable in a cost-effective manner for series production or mass production.

For example, a cooling-shell housing, in particular for an electric machine, is described in WO 2018/114 099 A1. There, the housing has a cooling shell extending from a fluid inlet to a fluid outlet, which cooling shell is formed in a housing wall and surrounds a central axis in a ring-like manner and is able to be flowed through by fluid. The cooling channel is in this case subdivided into multiple circumferentially adjacent cooling-shell segments, of which each one has a segment entry and a segment exit for the fluid. The fluid is divided at a first branching into two partial streams which lead to different cooling-shell segments.

A different approach for cooling an electric machine is described in DE 10 2018 129 226 A1. There, the electric machine has multiple winding pieces which are designed as hollow conductors and which form different coils of a winding of the electric machine and which are each part of a cooling circuit of the electric machine.

Against this background, it is an object of the invention to specify a particularly simple possibility for accommodating an electric machine that simultaneously allows effective cooling of the electric drive machine.

Each of the independent or alternative independent claims defines, by way of its features, subject matter which achieves said object. The dependent claims relate to advantageous refinements of the invention.

Disclosed according to one aspect is a cooling body for abutment against an outer surface, in particular in the form of a cylinder shell, to be cooled of a component, in particular a stator housing, to be cooled for an electric machine.

The cooling body has at least: a pliable circumferential wall, formed in particular in a tube-like manner, having at least one cooling-fluid line cross section and having a longitudinal extent that is of greater extent by a number of times in comparison with the line cross section, so that the cooling body forms at least one cooling channel.

A circumferential region is cut out from the circumferential wall along at least a part of the longitudinal extent such that the wall edges resulting from the cutout are configured for being brought into abutment against the outer surface of the component to be cooled. According to one embodiment, the cooling body is a tube from whose tube wall a part is cut out.

As a result of the cutout, the cooling fluid in the cooling body can flow directly along the outer surface of the component to be cooled. Consequently, a direct, and thus much greater, transfer of heat is achieved than in the case of a comparable cooling body which instead has its circumferential wall abutting against the outer surface of the component to be cooled.

Disclosed according to a further aspect is a stator-housing arrangement for an electric drive machine that has at least: (a) a stator housing with a stator-shell receptacle, said stator-shell receptacle having a cylinder inner shell to accommodate a stator outer shell and having an outer surface which is in the form of a cylinder shell; (b) at least one cooling body according to an embodiment of the invention that is arranged on the outer surface and is connected thereto at the wall edges.

Consequently, it is possible for there to be realized a very simple stator-cooling arrangement that combines great removal of heat owing to the cutout of the cooling body with a single-walled formation of the stator housing. Moreover, the fitting of the cooling body on the outer surface of the stator housing is conceivably straightforward.

Disclosed according to a further aspect is a method for assembling a stator-house arrangement that comprises at least the following method steps: (i) winding a cooling body according to one embodiment of the invention, and/or pushing on such a cooling body in a spread manner, around the outer surface of a stator-shell receptacle; (ii) if additionally necessary (that is to say according to one embodiment), bringing the wall edges into abutment against the outer surface; (iii) connecting, in particular adhesively bonding and/or fusing, the cooling body to the outer surface.

Consequently, it is possible for there to be provided a stator-cooling arrangement that is neither complex to assemble, such as for example in the case of a double-walled stator housing with an internally placed cooling-channel structure, nor complex to form, such as for example in the case of a stator housing having an encapsulated cooling-channel structure.

The invention is based inter alia on the consideration that, in the case of double-walled cast housings with internally placed cooling arrangement, the design-appropriate provision of the housing and the cooling channel(s) is frequently very complex (for example division of the housing, draft angles, etc.) and the sand cores and core supports required for realizing an internal cooling channel have to be knocked or shaken out in a complex manner following the casting process. Furthermore, the sealing of the coolant interfaces (for example in the region of the diversions), according to concept, is very complex and can constitute a certain residual risk of leakage. In the case of additive manufacturing, it is frequently the case that the installation size is limiting for the housing, or the process is not (yet) economical for large-series production owing to the duration and costs.

The invention, then, is based inter alia on the idea of laying a flexible, that is to say pliable, tube-like cooling body around a housing outer wall. The cooling body is open on the contact side toward the housing, that is to say the cooling medium flows directly on the outer wall of the housing, which ensures an optimal attachment and thus heat removal. Due to its flexible tube-like structure, the cooling body can be applied more or less in any desired form and with an arbitrary course. The open region of the cooling body is fixed, for example adhesively bonded, to the housing in order in this way to provide an outwardly closed system. The two coolant interfaces for feeding and discharge of a cooling fluid can be arranged on the two ends of the cooling body.

According to one embodiment, for a relatively straightforward assembly, the circumferential wall is of pliable form, in particular in the form of a flexible fabric and/or plastic tube.

According to an alternative embodiment, for a relatively robust design, the circumferential wall is formed by an in particular deep-drawn sheet-metal construction.

According to one embodiment, the wall edges form contact surfaces which are configured for being connected, in particular adhesively bonded and/or fused, for example ultrasound-welded or friction-welded, in a cooling-fluid-tight manner to the outer surface such that in particular the surface of the region to be adhesively bonded is enlarged and the adhesion is considerably improved.

This result in there being fixed a cooling channel whose delimitation cross section, in the cut-out circumferential region, is then formed by the outer surface of the component to be cooled itself. At the connection joints—for example in the form of an adhesive line or in the form of a melt of a material present in the circumferential wall or introduced for the purpose of connection—these possibly form the delimitation cross section.

According to one embodiment, the cut-out circumferential region makes up a proportion of between 25% and 60%, in particular of between 30% and 40%, of the entire circumference. It is thus possible—in a manner adapted to the usage situation—for a contact surface between the cooling fluid and the outer surface that is as large as possible to be combined with a cooling-fluid flow that is as large as possible.

According to one embodiment, the pliability of the circumferential wall is configured to allow the cooling body to be wound multiple times around an outer surface, in the form of a cylinder shell, which is in particular hollow, of the component to be cooled.

In particular, it is thus the case that the parameters for the pliability of the circumferential wall are selected in such a way that the bends arising for example due to a curvature of the outer surface of the component to be cooled and/or due to a desired cooling-channel geometry are able to be realized in a cooling-fluid-tight manner.

According to one embodiment, an outer surface in the form of a cylinder shell is cooled by a cooling body whose circumferential wall has a spiral-shaped or meandering or singly or multiply helical arrangement on the outer surface. According to one embodiment, away from the cut-out circumferential region, the line cross section is of part-ellipsoid, in particular circular-segment-shaped, form. This makes it possible for there to be conducted a large amount of cooling fluid in relation to a contact surface of the cooling fluid in the cut-out region of the circumferential wall of the cooling body.

According to one embodiment, away from the cut-out circumferential region, the line cross section is of prismatic, in particular rectangular, form. This makes it possible to combine a large contact surface of the cooling fluid with a small, for example radial, dimension of the cooling body.

According to one embodiment, the cut-out circumferential region has a constant mean circumferential position along the longitudinal extent of the cutout. This makes the cooling body relatively easy to produce.

According to one embodiment, an entry interface and an exit interface for the cooling fluid are arranged on opposite ends of the cooling body, and/or a conductor of the cooling fluid outside the cooling body is formed away from other constituent parts of the stator housing.

The fact that the cooling channel is formed exclusively by the outer surface of the stator housing and the circumferential wall of the cooling body means that the need for an outer wall of the stator housing is dispensed with. Consequently, it is likewise possible for the cooling-fluid conductor beyond the actual cooling surfaces to be decoupled completely from the stator housing.

Further advantages and possible uses of the invention emerge from the following description in conjunction with the figures.

DETAILED DESCRIPTION OF THE DRAWINGS

Figure 1:
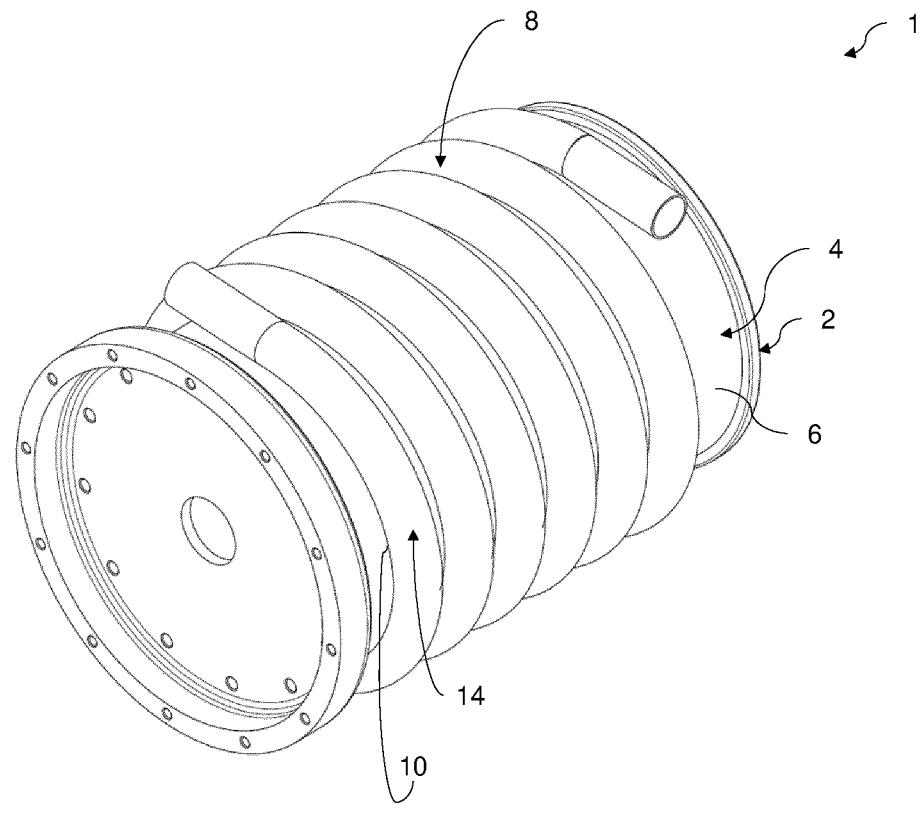
FIG. 1 shows in a schematic perspective view a stator-housing arrangement according to an exemplary embodiment of the invention.

FIG. 1 shows a stator-housing arrangement 1 for an electric drive machine of a motor vehicle. The stator-housing arrangement 1 has a stator housing 2 with a stator-shell receptacle 4, said stator-shell receptacle having a cylinder inner shell to accommodate a stator outer shell and having an outer surface 6 which is in the form of a cylinder shell.

The stator-housing arrangement 1 furthermore has a cooling body 8 which is designed with a circumferential wall 14 as a pliable tube composed of a plastic and/or rubber material, said tube being arranged on the outer surface 6 and adhesively bonded thereto at contact surfaces 11 of wall edges 10. The wall edges 10 result from a cutout 12 of a circumferential part of the cooling body in that circumferential region of a circumferential wall 14 at which the cooling body 8 abuts against the outer surface 6. In this way, the cooling body 8 forms a cooling channel 16.

As a result of the cutout 12, during the operation of the drive machine, the cooling fluid can remove the waste heat directly from the outer surface 6 without an additional transfer of heat through the circumferential wall 14. The cut-out circumferential region makes up a proportion of approximately 35% of the entire circumference. A sufficiently large proportion of the outer surface is thus brought into direct contact with the cooling fluid to ensure a sufficient transfer of heat. For simple manufacture of the cooling-body tube, the cut-out circumferential region has a constant mean circumferential position along the longitudinal extent of the cutout.

The cooling body 8 has an entry interface 18 and an exit interface 20 for the cooling fluid. A housing part arranged radially outside the cooling body is thus not required because, beyond the cooling body, the cooling fluid is not conducted into housing parts.

Figure 2:
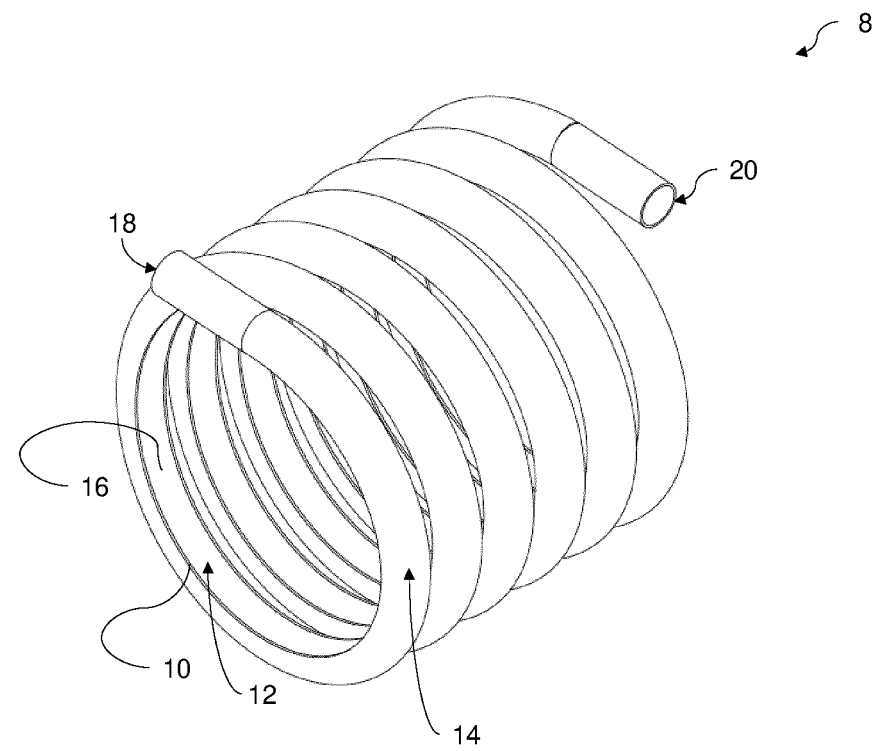
FIG. 2 shows in a schematic perspective view the cooling body of the stator-housing arrangement from FIG. 1, said cooling body being designed according to an exemplary embodiment.
Figure 3:
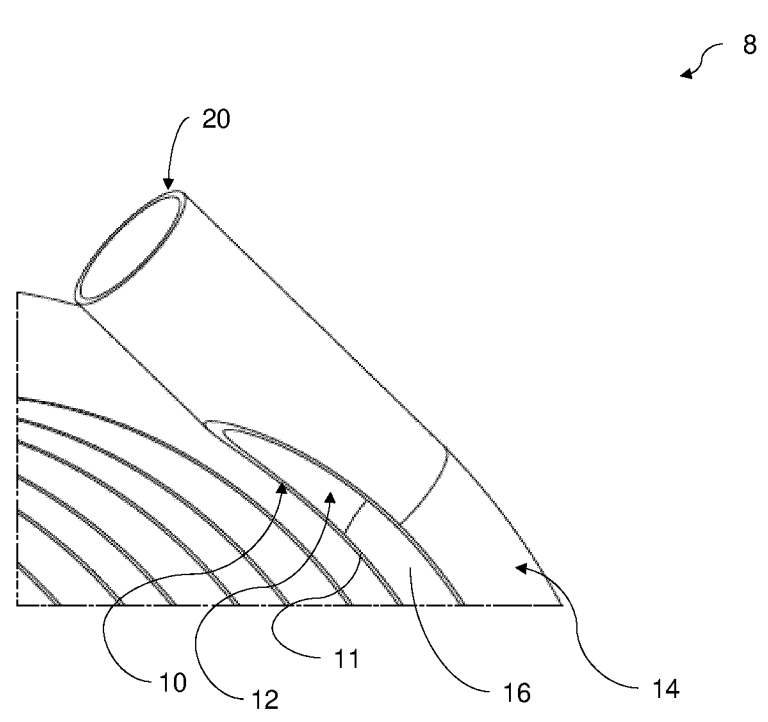
FIG. 3 shows a detail of the cooling body from FIG. 2 from another perspective.

The wall edges 10 with their contact surfaces 11 can be seen more clearly in FIGS. 2 and 3 than in FIG. 1. The wall edges 10 form contact surfaces 11 that are adhesively bonded in a cooling-fluid-tight manner to the outer surface.

The cooling body 8 may be designed here as a fabric tube and, in the present case, consists of a temperature-, weather- and cooling-media-resistant plastic. In particular, it is constructed with additional materials in a layered design. Said additional materials may be introduced in the tube either as filler materials or as fabric inserts and, on the one hand, increase the strength/resistance of the fabric tube and, on the other hand, improve the adhesive action thereof toward the housing surface. In this respect, it is possible for example for a thin aluminum fabric layer to be applied to (in particular vulcanized on) the contact side of the tube toward the housing 2.

For the actual adhesion process, the fabric tube is in the present case applied to the housing 2 under slight tension (cf. the application of grip tape to a tennis racket). In the example illustrated here, on its contact side toward the housing, the tube has, as contact surfaces 11, a peripheral collar which enlarges the surface of the region to be adhesively bonded and which considerably improves the adhesion. For clarity of illustration, the collar is not illustrated in FIGS. 1 to 3.

Figure 4:
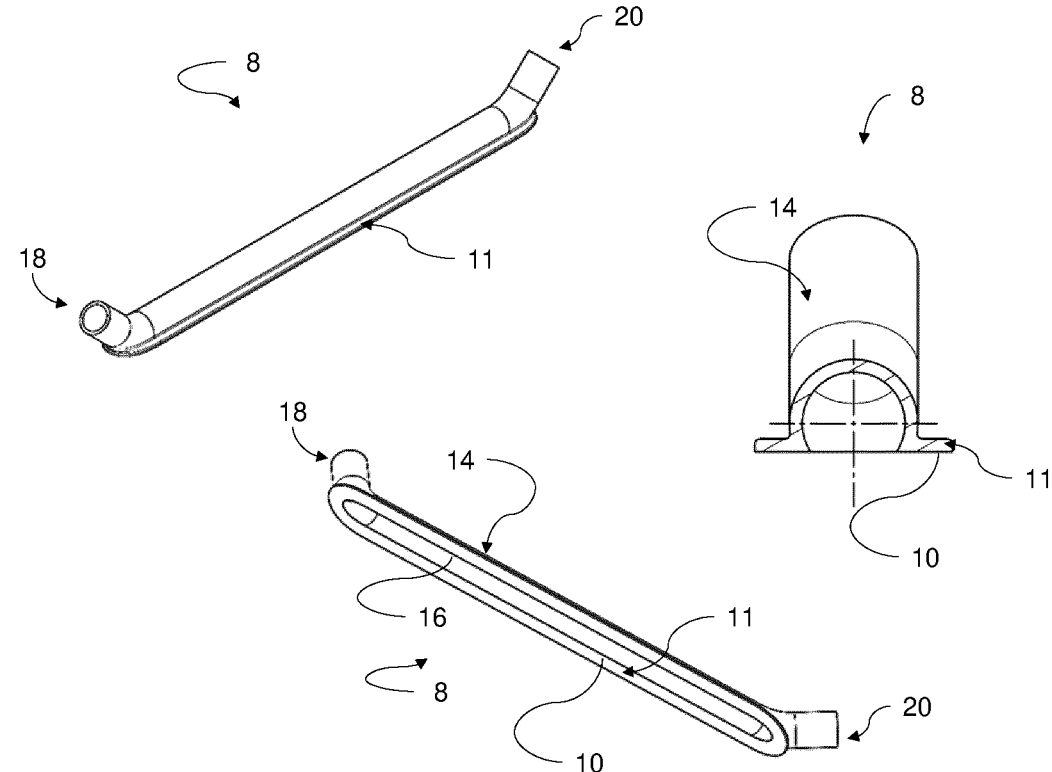
FIG. 4 shows in three different views a pliable cooling body according to an embodiment of the invention prior to being wound onto the stator housing of the stator to be cooled.

FIG. 4 illustrates the cooling body prior to being wound onto the housing 2 in different views—two different perspective views and a sectional view. In this case, the contact surfaces 11 in the form of a collar can be clearly seen. Such a contact-surface collar 11 may, for example, be connected as a separate component to the actual tube body by way of vulcanization. Aside from its main function of causing the tube to adhere to the housing surface, the adhesive also performs the function of sealing off the cooling medium. The adhesion of the tube to the housing is realized here by common one- or two-component adhesives for plastics and metal (for example from the companies 3M, Würth, Loctite or Weicon) by means of process steps "cleaning and degreasing surfaces", "mixing and applying adhesive", "joining and positioning bonding partner" and "allowing adhesive to cure (thermally or at room temperature)". Alternatively, it would be possible, especially in the case of the tube with collar, for a type of adhesive layer to already be applied directly to the collar, said adhesive layer being protected by for example a peel-off film until assembly. When said film is peeled off, the adhesive reacts for example with the ambient air or in a furnace and starts to cure.

The exemplary embodiment thus reveals a flexible tube-like cooling body 8 which is open on its contact side toward the housing (see in particular the enlarged illustration in FIG. 3). This means that the cooling medium flows directly along the outer wall 6 of the stator housing 2, which ensures an optimal cooling attachment and thus heat removal.

Additionally, the stator housing 2 is machined, for example roughened, on its contact side toward the cooling body 8 in such a way that this surface provides a best possible cooling attachment for the cooling tube.

The cooling body is mechanically connected and adhesively bonded to the housing via its contact surface facing toward said housing, in order in this way to provide an outwardly closed cooling channel 16. The flexibly pliable tube-like cooling body 8 makes possible almost any desired design of the cooling channel, for example with a meandering form, helical form or some other form, in a simple manner.

In an alternative exemplary embodiment (not illustrated), the cooling body 8 (which otherwise may be formed as in FIGS. 1 to 3 and/or may have a collar as in FIG. 4) is formed from aluminum sheet metal and connected to the housing surface by a welding process.

In the case of a thin-walled tube body composed of aluminum, there is lower flexibility than in the case of the fabric tube. It goes without saying that a thin wall thickness of the tube body allows a certain flexibility/adaptability in the contour to be achieved, although this does not reach that of the fabric tube. For these reasons, it is necessary to base the inner contour of the tube body as much as possible on the outer contour of the housing, on the one hand, and the course of the cooling channel (a spiral shape in the example illustrated here) as much as possible thereon, on the other hand, which already has to be taken into consideration during the production process for the tube body (for example deep-drawing and contour deformation). For better tolerance compensation and for improving the sealing action, a peripheral pad can be attached on the contact side of the tube body toward the housing. Just like the fabric tube, on its contact side toward the housing, the tube body may have a peripheral collar (cf. FIG. 4) which enlarges the surface of the region to be welded and which improves the sealing action (with the optional pads). Analogously to the fabric tube, such a collar may, for example, be connected (adhesively bonded) as a separate component to the actual tube body, or such a collar may be provided directly during the production process for the tube body.

For better accessibility of the electrode during the welding operation, a sufficient distance between the individual spirals has to be ensured. In addition, the process reliability of the welding operation can be improved with regard to leakage by a tool (for example a quarter-circle-shaped stamp). Said tool pushes the outer contour of the hose body onto the housing in a defined manner. Said tool runs together with the electrode circumferentially around the hose body, so that the contact between the inner contour of the hose body and the outer contour of the housing is always ensured in the region of the present welding operation.

LIST OF REFERENCE SIGNS

Stator-housing arrangement 1
Stator housing 2
Stator-shell receptacle 4
Outer surface 6
Cooling body 8
Wall edges 10
Contact surface/collar 11
Cutout 12
Circumferential wall 14
Cooling channel 16
Entry interface 18
Exit interface 20

What is claimed is:

1. A cooling body configured to abut against an outer surface to be cooled of a stator housing, comprising:
   a circumferential wall, wherein a cut-out circumferential region is cut out from the circumferential wall along at least a part of a longitudinal extent thereof as a cutout such that wall edges formed as a result are configured to be brought into abutment against the outer surface of the stator housing.

2. The cooling body according to claim 1,
wherein the circumferential wall is in a form of a flexible fabric and/or plastic tube.

3. The cooling body according to claim 1,
wherein the circumferential wall is formed by a deep-drawn sheet-metal construction.

4. The cooling body according to claim 1,
wherein the wall edges form contact surfaces which are configured to be adhesively bonded and/or fused in a cooling-fluid-tight manner to the outer surface of the stator housing.

5. The cooling body according to claim 1,
wherein the cut-out circumferential region makes up a proportion of between 25% and 60% of an entire circumference.

6. The cooling body according to claim 5,
wherein the cut-out circumferential region makes up a proportion of between 30% and 40% of the entire circumference.

7. The cooling body according to claim 1,
wherein a pliability of the circumferential wall is configured to allow the cooling body to be wound multiple times around the outer surface of the stator housing, wherein the outer surface is in the form of a cylinder shell.

8. The cooling body according to claim 1,
wherein, away from the cut-out circumferential region, a line cross section of the cooling body is part-ellipsoid form, circular-segment-shaped form, prismatic form, or rectangular form.

9. The cooling body according to claim 1,
wherein the cutout has a constant mean circumferential position along the longitudinal extent of the cutout.

10. The stator-housing arrangement according to claim 9,
wherein an entry interface and an exit interface for the cooling fluid are arranged on opposite ends of the cooling body.

11. The stator-housing arrangement according to claim 9,
wherein a conductor of the cooling fluid outside the cooling body is formed away from other constituent parts of the stator housing.

12. A stator-housing arrangement for an electric drive machine, comprising:

a stator housing with a stator-shell receptacle, said stator-shell receptacle having a cylinder inner shell to accommodate a stator outer shell, and having an outer surface which is in the form of a cylinder shell; and at least one cooling body according to claim 1 that is arranged on the outer surface of the stator housing and is connected thereto at the wall edges.

13. The stator-housing arrangement according to claim 12, wherein the cooling body is wound multiple times around the outer surface of the stator housing in a helical arrangement.

14. The stator-housing arrangement according to claim 12, wherein the cooling body is adhesively bonded to the outer surface of the stator housing.

15. The cooling body according to claim 1, wherein the circumferential wall is pliable.

16. The cooling body according to claim 1, wherein the wall edges form contact surfaces configured to be connected to the outer surface of the stator housing.

17. The cooling body according to claim 1, wherein the cooling body forms a cooling channel, and wherein the cutout enables cooling fluid in the cooling body to flow directly along the outer surface of the stator housing.

18. A method for assembling a stator-house arrangement, comprising:

winding a cooling body and/or pushing on the cooling body in a spread manner around an outer surface of a stator-shell receptacle, wherein the cooling body includes a circumferential wall, wherein a cut-out circumferential region is cut out from the circumferential wall along at least a part of a longitudinal extent thereof as a cutout such that wall edges formed as a result are configured to be brought into abutment against the outer surface of the stator housing; and adhesively bonding and/or fusing the cooling body to the outer surface.

19. The method according to claim 18, wherein the cooling body is wound multiple times around the outer surface of the stator-shell receptacle.

20. The method according to claim 18, wherein the outer surface of the stator-shell receptacle is in the form of a cylinder shell.

* * * * *